US008064337B2

(12) United States Patent
Shin et al.

(10) Patent No.: US 8,064,337 B2
(45) Date of Patent: Nov. 22, 2011

(54) METHOD FOR CONNECTING TO A WIRELESS INTERNET SERVICE

(75) Inventors: Keun Hee Shin, Seoul (KR); In Seong Hwang, Seoul (KR); Hee Won Park, Seoul (KR); Sang Ho Chae, Seoul (KR); Chang Ho Choi, Goyang-si (KR); Won Hee Sull, Seongnam-si (KR)

(73) Assignee: SK Telecom Co., Ltd. (KR)

( * ) Notice: Subject to any disclaimer, the term of this patent is extended or adjusted under 35 U.S.C. 154(b) by 956 days.

(21) Appl. No.: 11/952,645

(22) Filed: Dec. 7, 2007

(65) Prior Publication Data

US 2008/0076397 A1    Mar. 27, 2008

Related U.S. Application Data

(63) Continuation-in-part of application No. 10/496,268, filed on Sep. 23, 2004, now abandoned.

(51) Int. Cl.
*H04L 12/26* (2006.01)
(52) U.S. Cl. ..... 370/225; 370/401; 370/449; 370/414.1; 370/352; 370/354; 45/414.1; 45/66.1; 379/212.01; 379/221.09; 379/211.09; 379/88; 379/67

(58) Field of Classification Search ................ 370/331, 370/354, 401, 449, 225, 352, 353, 355, 356, 370/398; 455/414, 66.1, 414.1; 379/88.01, 379/212.01, 221.09, 211.02, 88, 37, 201.01, 379/207.02; 714/39; 709/205, 204, 235
See application file for complete search history.

(56) References Cited

U.S. PATENT DOCUMENTS

| 6,883,168 | B1 * | 4/2005 | James et al. ................. 717/178 |
| 7,496,554 | B2 * | 2/2009 | Kaplan ............................. 1/1 |
| 2003/0191988 | A1 * | 10/2003 | Dalal et al. ...................... 714/39 |
| 2005/0256926 | A1 * | 11/2005 | Muhonen et al. ............ 709/205 |

* cited by examiner

*Primary Examiner* — Patrick Edouard
*Assistant Examiner* — Fred Casca
(74) *Attorney, Agent, or Firm* — Baker + Hostetler LLP

(57) ABSTRACT

In a wireless data communication network, a mobile terminal is reconnected to a contents provider, when a connection established between the mobile terminal and the contents provider is interrupted or after a completion of the downloading of contents, by using return address information and contents address information including addresses of the contents provider and a web page including information relating to the downloaded contents, respectively. A WML (wireless markup language) script including the contents address information and the return address information is provided to the mobile terminal before initiating the downloading of the contents. In this way, the mobile terminal can easily be reconnected to the contents provider when the connection established between the mobile terminal and the contents provider is interrupted due to network congestion or the mobile terminal leaving the service coverage area.

10 Claims, 3 Drawing Sheets

METHOD FOR CONNECTING TO A WIRELESS INTERNET SERVICE

This application is a Continuation-In-Part Application of application Ser. No. 10/496,268 filed on Sep. 23, 2004.

FIELD OF THE INVENTION

The present invention relates to a method for connecting a mobile terminal to a wireless Internet service; and, more particularly, to a method for reconnecting a mobile terminal to a wireless Internet service, when a connection established between the mobile terminal and a service provider is interrupted or after a completion of a downloading of contents, by providing in advance return address information and contents address information including internet addresses of the service provider and a web page containing information on the downloaded contents, respectively.

BACKGROUND OF THE INVENTION

Users of a mobile telecommunications service can download a variety of multimedia contents from a contents provider through a wireless data network, and such trend for a wireless multimedia service is expected to increase continuously. The multimedia contents, which are downloadable through a wireless data network, include, e.g., advertisement character messages, news, information on stock market, materials for students, real-time audio and video streaming data, and the like.

As a mobile terminal for downloading such multimedia data through a wireless data network, a third-generation mobile communications terminal, i.e., an IMT-2000 terminal, which includes a WAP (wireless application protocol) browser and a VOD (video on demand) player for downloading and playing multimedia contents, has been introduced.

While a conventional wireless data network is capable of transmitting data such as character messages at a transmission rate of several tens of Kbps, a high-speed wireless data network is now used in providing multimedia contents to users at a transmission rate of several hundreds of kbps to several Mbps.

However, in the high-speed wireless data network, a connection established between a mobile terminal and a contents provider may be interrupted due to a network congestion caused by an instantaneous surge of requests for connection thereto or the mobile terminal leaving the service coverage area. Accordingly, in such cases, there is a need for a method for the user of the wireless data network to be easily reconnected to the contents provider.

SUMMARY OF THE INVENTION

It is, therefore, a primary object of the present invention to provide a method for reconnecting a mobile terminal to a wireless Internet service provider, when a connection established between the mobile terminal and the service provider is interrupted, by providing in advance return address information.

It is another object of the present invention to provide a method for reconnecting a mobile terminal to a wireless Internet service provider, when a connection established between the mobile terminal and the service provider is interrupted or after a completion of a downloading of contents, by providing in advance return address information and/or contents address information.

In accordance with a preferred embodiment of the present invention, there is provided a method for connecting a mobile terminal to a contents provider having a plurality of multimedia contents through a wireless data communication network, wherein the contents provider includes a media server for providing the multimedia contents to the mobile terminal, comprising the steps of: (a) if one of the contents listed in a web page provided by the contents provider is selected by a user of the mobile terminal, transmitting to the mobile terminal data including an address of said selected one of the contents and return address information; (b) connecting the mobile terminal to the media server by using the address of said selected one of the contents; (c) checking whether the connection established between the mobile terminal and the media server is interrupted while the mobile terminal is downloading said selected one of the selected contents from the media server; (d) reconnecting the mobile terminal to a web page corresponding to the return address information, if the connection is found interrupted in step (c), wherein the web page corresponding to the return address information is different from the web page in step (a).

In accordance with another preferred embodiment of the present invention, there is provided a method for connecting a mobile terminal to a contents provider having a plurality of multimedia contents through a wireless data communication network, wherein the contents provider includes a media server for providing the multimedia contents to the mobile terminal, comprising the steps of: (a) if one of the contents listed in a web page provided by the contents provider is selected by a user of the mobile terminal, transmitting to the mobile terminal data including an address of said selected one of the contents, return address information and contents address information; (b) connecting the mobile terminal to the media server by using the address of the contents; (c) checking whether the connection established between the mobile terminal and the media server is interrupted while the mobile terminal is downloading said selected one of the selected contents from the media server; and (d) reconnecting the mobile terminal to a web page corresponding to the return address information, if the connection is found interrupted in step (c), wherein the web page corresponding to the return address information is different from the web page in step (a); and (e) connecting the mobile terminal to a web page corresponding to the contents address information relating to the selected contents, after a completion of the download of said selected one of the selected contents.

BRIEF DESCRIPTION OF THE DRAWINGS

The above and other object and features of the present invention will become apparent from the following description of preferred embodiments given in conjunction with the accompanying drawings, in which.

DETAILED DESCRIPTION OF THE PREFERRED EMBODIMENT

Figure 1:
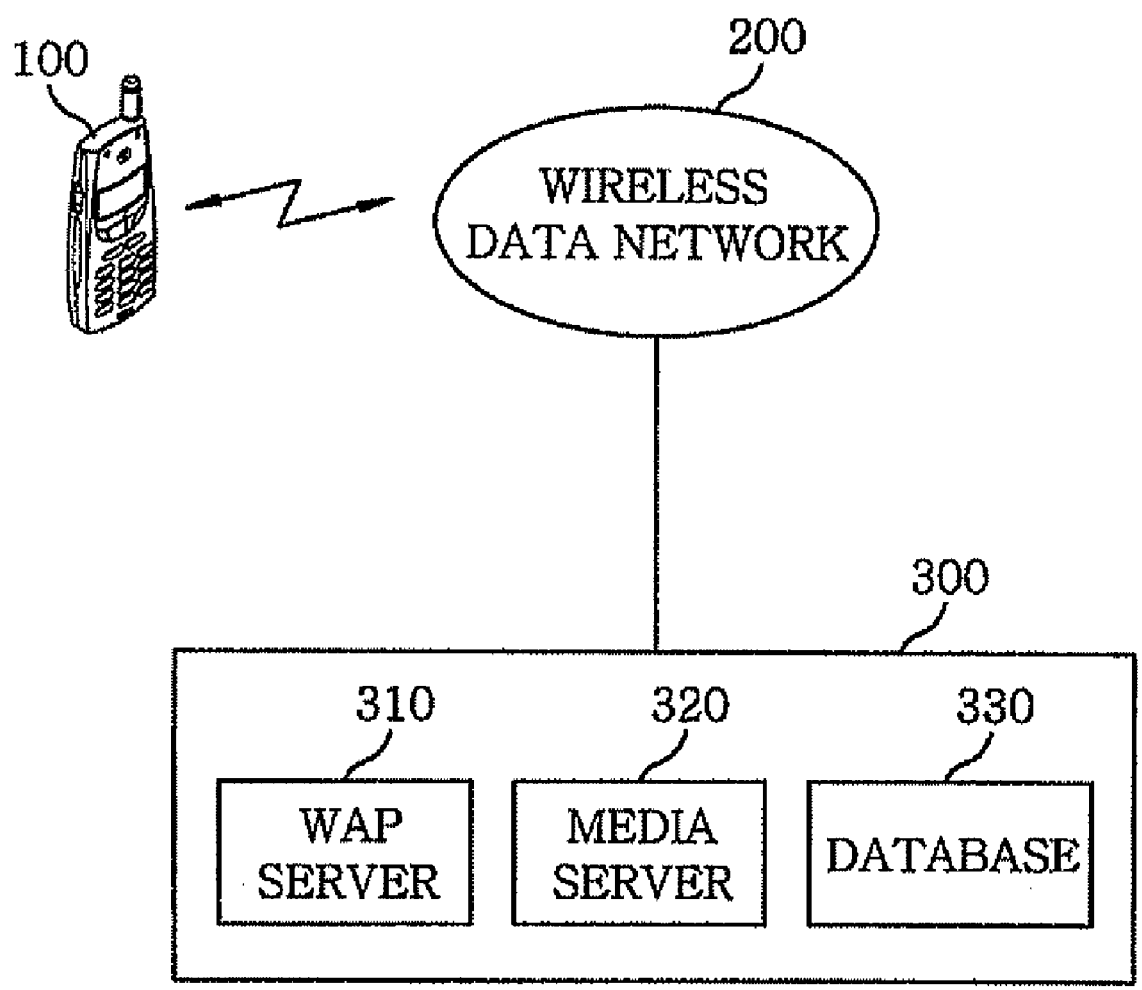
FIG. 1 describes structures of a mobile terminal and a contents provider connected to a wireless data communication network employing a method in accordance with the present invention.

FIG. 1 describes structures of a mobile terminal and a contents provider connected to a wireless data communication network employing a method in accordance with the present invention. Referring to FIG. 1, the mobile terminal 100 and the contents provider 300 are connected to each other through the wireless data network 200. For the sake of simplicity, only one mobile terminal 100 and one contents provider 300 are illustrated in FIG. 1. However, in a real wireless communications network, more than one mobile terminal may be connected to more than one contents provider.

As illustrated in FIG. 1, the contents provider 300 includes a WAP server 310 for providing a web page containing information on multimedia contents, a media server 320 for providing selected contents to the mobile terminal 100, and a database 330 for storing multimedia contents.

The mobile terminal 100 includes therein a WAP browser for displaying a web page received from the WAP server 310 and a VOD player for downloading and playing selected contents from the media server 320. The WAP browser receives a web page including a menu for selecting contents from the WAP server 310 and displays the received web page in a display window of the mobile terminal 100. Further, the VOD player downloads contents selected by a user through the web page and displays the downloaded contents in the display window.

In the following, there will be described in detail a procedure whereby the mobile terminal 100 is connected to the contents provider 300 through the wireless data network 200.

First, the mobile terminal 100 requests a connection to the contents provider 300 through the wireless data network 200. Once a connection is established between the mobile terminal 100 and the contents provider 300, the WAP server 310 transmits to the mobile terminal 100 a web page including a menu to be used at the mobile terminal 100 for selecting one of currently available contents. Thereafter, the WAP browser displays the transmitted web page in the display window of the mobile terminal 100.

If a user of the mobile terminal 100 selects one of the contents listed in the menu of the web page, which is displayed in the display window of the mobile terminal, the WAP server 310 transmits a WML (wireless markup language) script containing information on the selected contents to the mobile terminal 100 through the wireless data network 200. The WML script includes, as its parameters, an ID of a provider of the selected contents, an ID of the selected contents, an IP address of the media server 320 for providing the selected contents, an MO (mux option), an SO (service option), and other information on the selected contents (e.g., a title, author, and size of the contents). Further, the WML script may include additionally, return address information and/or contents address information. Herein, the return address information indicates an Internet address of the contents provider, which is used by the mobile terminal 100 to reconnect itself to the contents provider 300 when the connection established between the mobile terminal 100 and the contents provider 300 is interrupted. Further, the contents address information, which is predetermined by the WAP server 310, indicates a link to a web page including information relating to the selected contents.

Thereafter, the WAP browser of the mobile terminal 100 changes the MO and/or the SO setting included in the WML script, and provides the changed MO and/or SO setting to the wireless data network 200. The wireless data network 200 allocates a high-speed data transmission channel to the mobile terminal 100 in accordance with the changed MO and/or SO setting.

After the high-speed data transmission channel is established between the mobile terminal 100 and the contents provider 300, the VOD player of the mobile terminal 100 is connected to the media server 320 by using the address of the selected contents included in the WML script. Then, the media server 320 searches for the selected contents in the database 330. If the selected contents are found in the database 330, the media server 320 starts to upload the selected contents to the mobile terminal 100.

Meanwhile, in the wireless data network 200, the connection established between the mobile terminal 100 and the contents provider 300, i.e., the media server 320, may be interrupted due to network congestion or the mobile terminal 100 leaving the service coverage area. In this case, the mobile terminal 100 may be reconnected to the contents provider 300 by using the return address information included in the WML script. If a connection between the mobile terminal 100 and the contents provider 300 is established again, the WAP server 310 of the contents provider 300 may provide a web page corresponding to the return address information. The web page corresponding to the return address information may contain a menu. Thereafter, the user of the mobile terminal 100 can select contents to be downloaded by using the menu in the web page. And, the web page corresponding to the return address information may be different from the web page which the mobile terminal had connected before the connection was interrupted. For example, the web page corresponding to the return address information may provide connection information explaining the interruption, fee information, or interruption guide information listing what the user can do after the interruption occurred. And, the web page corresponding to the return address information may provide a menu asking the user to download continuously or to receive another service. Moreover, the web page corresponding to the return address information may provide guide information according to the interruption case. And, the web page corresponding to the return address information may be predetermined by the contents provider 300. Therefore, the contents provider can provide a convenient service by providing the return address information.

In a similar manner, after the selected contents are completely downloaded, the mobile terminal 100 may use the contents address information to receive a web page including information relating to the selected contents.

Figure 2:
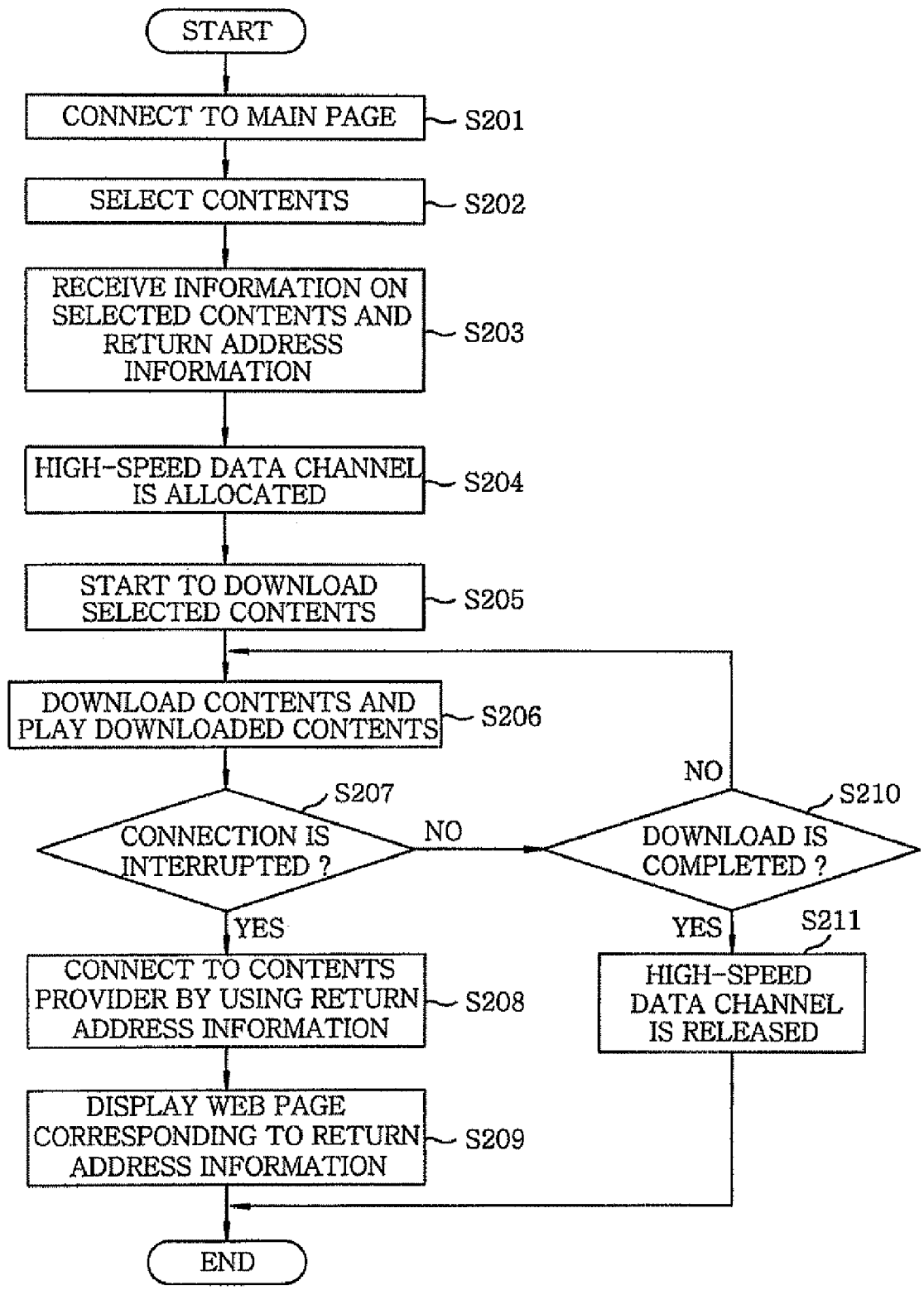
FIG. 2 charts a flowchart showing a method for connecting a mobile terminal to a wireless data network in accordance with a preferred embodiment of the present invention.

FIG. 2 charts a flowchart showing a method for connecting a mobile terminal to a wireless data network in accordance with a preferred embodiment of the present invention.

First, the mobile terminal 100 requests a connection to the contents provider 300 through the wireless data network 200. Once a connection is established between the mobile terminal 100 and the contents provider 300, the WAP server 310 of the contents provider 300 transmits to the mobile terminal 100 a web page, i.e., a main page, including a menu listing currently available contents. Thereafter, the WAP browser displays the transmitted web page in the display window of the mobile terminal 100 (S201).

If a user of the mobile terminal 100 selects one of the contents listed in the menu of the web page (S202), the WAP server 310 transmits a WML (wireless markup language) script containing information on the selected contents and return address information to the mobile terminal 100 through the wireless data network 200 (S203).

Thereafter, the WAP browser of the mobile terminal 100 changes the MO and/or SO setting, included in the WML script, and provides the changed MO and/or SO setting to the wireless data network 200. The wireless data network 200 allocates a high-speed data transmission channel to the mobile terminal 100 in accordance with the changed MO and/or SO setting (S204).

After the high-speed data transmission channel is established between the mobile terminal 100 and the contents provider 300, the VOD player of the mobile terminal 100 is connected to the media server 320 by using the address of the selected contents included in the WML script. Then, the media server 320 searches for the selected contents in the database 330. If the selected contents are found in the database 330, the mobile terminal 100 starts to download the selected contents from the media server 320 (S205).

While the selected contents are being downloaded, the VOD player checks whether the connection established between the mobile terminal 100 and the contents provider 300, i.e., the media server 320, is interrupted due to network congestion and so on (S206 and S207). Further, the VOD player checks whether the downloading of the selected contents is completed (S210). Although step S207 is to be executed sequentially after step S206, step S207 may be performed periodically or at random, while step S206 is being performed.

If there is no interruption while the selected contents are being downloaded, the VOD player continuously downloads and plays the selected contents. After the downloading of the selected contents is completed, the mobile terminal 100 changes the MO and the SO setting, and provides the changed MO and SO setting to the wireless data network 200, thereby allowing the high-speed data transmission channel allocated for the mobile terminal 100 to be retracted. (S211).

However, if the connection established between the mobile terminal 100 and the contents provider 300 is interrupted while the selected contents are being downloaded, the mobile terminal 100 is reconnected to the contents provider 300, i.e., the WAP server 310, by using the return address information included in the WML script (S208). If a connection between the mobile terminal 100 and the contents provider 300 is established again, the WAP server 310 of the contents provider 300 provides a web page containing a menu for selecting contents to the mobile terminal 100 (S209). Thereafter, the user of the mobile terminal 100 can select contents to be downloaded by using the menu in the web page.

Figure 3:
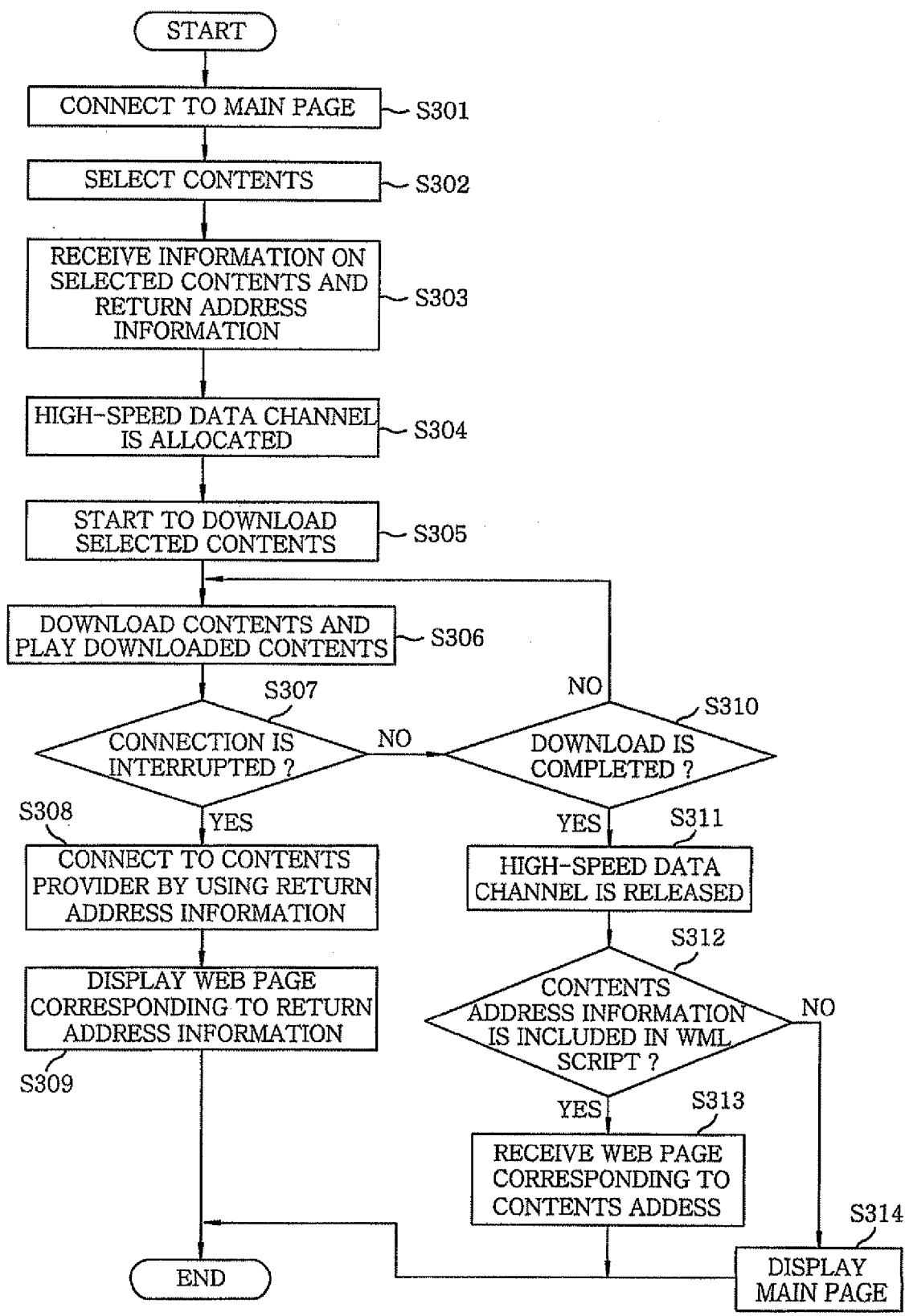
FIG. 3 depicts a flowchart showing a method for connecting a mobile terminal to a wireless data network in accordance with another preferred embodiment of the present invention.

FIG. 3 exhibits a flowchart showing a method for connecting a mobile terminal to a wireless data network in accordance with another preferred embodiment of the present invention.

In FIG. 3, steps S301 to S311 are performed in the same way as described above with reference to steps S201 to S211 in FIG. 2 and, therefore, the explanations thereof are omitted. However, in step S303, a WML script transmitted from the WAP server 310 to the mobile terminal 100 includes return address information and/or contents address information as well as information on the selected contents.

If the downloading of the selected contents is completed without being interrupted (S310 and S311), the WAP browser of the mobile terminal 100 checks whether the WML script transmitted from the WAP server 310 includes contents address information (S312). If the contents address information is found in the WML script, a web page corresponding to the contents address information is displayed in the display window of the mobile terminal 100 (S313). The web page corresponding to the contents address information may contain information relating to the downloaded contents. For example, the web page corresponding to the contents address information may provide information about a download result or a payment result, an advertisement or recommended contents lists. And, if the downloaded contents are one of a series, the web page corresponding to the contents address information may provides another contents of the series. Moreover, the web page corresponding to the contents address information may provide information listing what the user has to do after downloading contents. Therefore, the contents provider can provide a convenient service by providing the contents address information. However, if the contents address information is not included in the WML script, the WAP browser displays again the main page in the display window of the mobile terminal 100 (S314).

In the preferred embodiments of the present invention, the return address information and/or the contents address information is included in the WML script transmitted from the WAP server 310 to the mobile terminal 100. However, the return address information and/or the contents address information may be included in a header of contents selected by a user of the mobile terminal 100. It prevents adding a return address information field and a contents address information field in the database 330.

While the invention has been shown and described with respect to the preferred embodiments, it will be understood by those skilled in the art that various changes and modifications may be made without departing from the spirit and scope of the invention as defined in the following claims.

What is claimed is:

1. A method for connecting a mobile terminal to a contents provider having a plurality of multimedia contents through a wireless data communication network, wherein the contents provider includes a media server for providing the multimedia contents to the mobile terminal, comprising the steps of:
  (a) if one of the contents listed in a first web page provided by the contents provider is selected by a user of the mobile terminal, transmitting to the mobile terminal data including an address of said selected one of the contents and return address information;
  (b) connecting the mobile terminal to the media server by using the address of said selected one of the contents;
  (c) checking whether the connection established between the mobile terminal and the media server is interrupted while the mobile terminal is downloading said selected one of the selected contents from the media server;
  (d) reconnecting the mobile terminal to a second web page corresponding to the return address information, if the connection is found interrupted in step (c), wherein the second web page corresponding to the return address information is different from the first web page in step (a); and
  (e) connecting the mobile terminal to a third web page corresponding to contents address information which is included in the data of the step (a) and related with the selected contents, after a completion of the download of said selected one of the selected contents,
  wherein the second web page corresponding to the return address information is predetermined by the contents provider, and
  wherein the second web page corresponding to the return address information provides one of connection information explaining the interruption, interruption guide information listing what the user can do after the interruption occurred, a menu asking the user to download continuously or to receive another service, guide information according to the interruption, and fee information.

2. The method of claim 1, wherein the data is a WML (wireless markup language) script.

3. The method of claim 1, wherein at least one of the return address information and the contents address information is included in a header of said selected one of the selected contents transmitted from the media server to the mobile terminal.

4. The method of claim 1, wherein the third web page corresponding to the contents address information provides information about a download result.

5. The method of claim 1, wherein the third web page corresponding to the contents address information provides information about a payment result.

6. The method of claim 1, wherein the third web page corresponding to the contents address information provides an advertisement.

7. The method of claim 1, wherein the third web page corresponding to the contents address information provides recommended contents lists.

8. The method claim of 1, wherein the third web page corresponding to the contents address information provides information listing what the user has to do after downloading contents.

9. The method of claim 1, wherein the second web page corresponding to the return address information is predetermined by the contents provider.

10. The method of claim 1, wherein the second web page corresponding to the return address information provides guide information according to the interruption case.

* * * * *